United States Patent [19]

Allison

[11] 3,840,089

[45] Oct. 8, 1974

[54] LOAD TRANSPORT SYSTEM

[75] Inventor: John L. Allison, New Orleans, La.

[73] Assignee: Textron Inc., Providence, R.I.

[22] Filed: Jan. 15, 1973

[21] Appl. No.: 323,933

[52] U.S. Cl. .............................................. 180/116
[51] Int. Cl. ............................................. B60v 1/06
[58] Field of Search .......................... 180/116–130

[56] References Cited
UNITED STATES PATENTS

| | | | |
|---|---|---|---|
| 3,078,938 | 2/1963 | Bollum | 180/116 |
| 3,183,988 | 5/1965 | Jones | 180/117 |
| 3,244,247 | 4/1966 | Weiland | 180/122 X |
| 3,401,767 | 9/1968 | Barr | 180/127 X |
| 3,414,075 | 12/1968 | Bertin | 180/121 |
| 3,662,853 | 5/1972 | Love | 180/116 X |

FOREIGN PATENTS OR APPLICATIONS

| | | | |
|---|---|---|---|
| 1,207,960 | 10/1970 | Great Britain | 180/128 |

Primary Examiner—David Schonberg
Assistant Examiner—Terrance L. Siemens
Attorney, Agent, or Firm—Bean & Bean

[57] ABSTRACT

Pluralities of standardized type and sized ground effect machine modules of novel form are provided, along with means for connecting them together and to the load platform to be moved in air-sealing juxtaposed relationship. They are thus adapted to a large variety of plan-view arrangements relative to a load platform to be lifted and moved providing in combination therewith a novel ground effect machine system capable of lifting heavy loads and transpositioning them in improved manner over terrain conditions such as are not suitable to be negotiated by wheeled or caterpillar-treaded vehicles, boats, or the like. The invention features improved overall efficiencies in connection with such operations, and improved versatility to cope with a large variety of heavy load transport problems under conditions as aforesaid.

8 Claims, 10 Drawing Figures

PATENTED OCT 8 1974

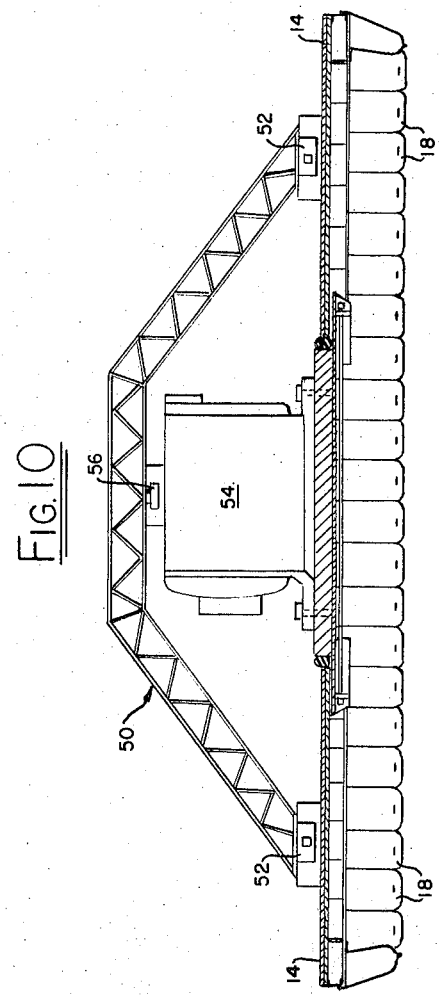

LOAD TRANSPORT SYSTEM

BRIEF SUMMARY AND BACKGROUND OF THE INVENTION

This invention relates to either long distance transport or short distance transpositioning of heavy loads; employing in any desired combination (selected from a large variety of available combinations) a plurality of "standardized" yet functionally different air cushion type support modules. The system is particularly useful for positionally shifting and/or conveying heavy freight, personnel, supplies, machinery, tools, or the like; over land, water, ice, snow soft or marshy soil, or any other terrain or surface such as may not for practical purposes be satisfactorily traversed by boats, sleds, wheeled vehicles, or the like.

Ground effect systems have previously been proposed for such purposes such as in U.S. Pat. Nos. 3,473,624 and 3,693,729 wherein the load platform is provided with cushion-air enclosing skirts or the like suspended therefrom. U.S. Pat. No. 3,662,853 suggests the use of a plurality of individually complete air cushion vessels, arranged outside of and beyond opposite sides of the load to be lifted, and carrying overhead a cross beam(s) from which the load is intermediately suspended. U.S. Pat. No. 3,401,767 teaches the use of a plurality of individually complete air cushion modules, packed together in side-by-side relation to provide overall a single load carrying platform, shaped and sized according to the loads to be carried. Also, see page 51 JANE'S "Surface Skimmer Systems," McGraw-Hill Book Co., N.Y.C. 1967.

It is an object of the present invention to provide an improved modular type air cushion means for attachment to a load container and for moving it over all types of terrain or water.

It is another object to provide a system as aforesaid comprising a plurality of "standardized" type modules which may be variably connected to and in combination with a standing in place load platform, to provide a functionally novel integrated load support system.

Other objects and advantages of the invention will appear from the following specification and the accompanying drawing in which the invention is illustrated by way of example and in which:

THE DRAWING

FIG. 10 is a view corresponding to FIG. 2 showing a modified form of the transport system.

DETAILED DESCRIPTION

Figure 1:
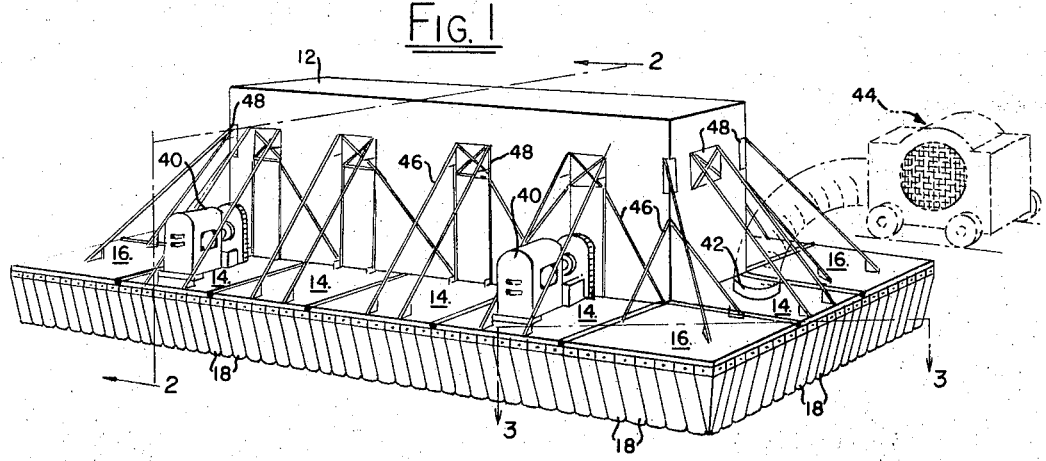
FIG. 1 is a top perspective view of a load transport system of the invention; comprising a functional combination of pluralities of two different type air cushion support modules of the present invention operatively connected to a load container.
Figure 2:
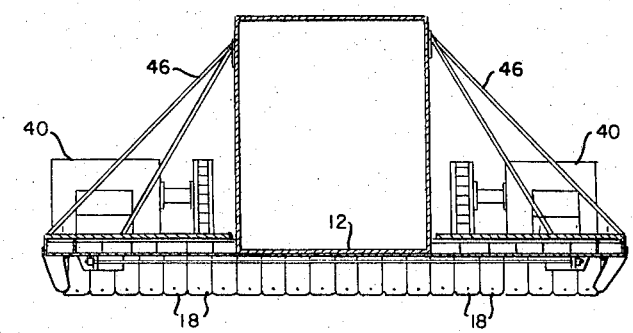
FIG. 2 is a sectional view, taken as suggested by line 2—2 of FIG. 1.
Figure 5:
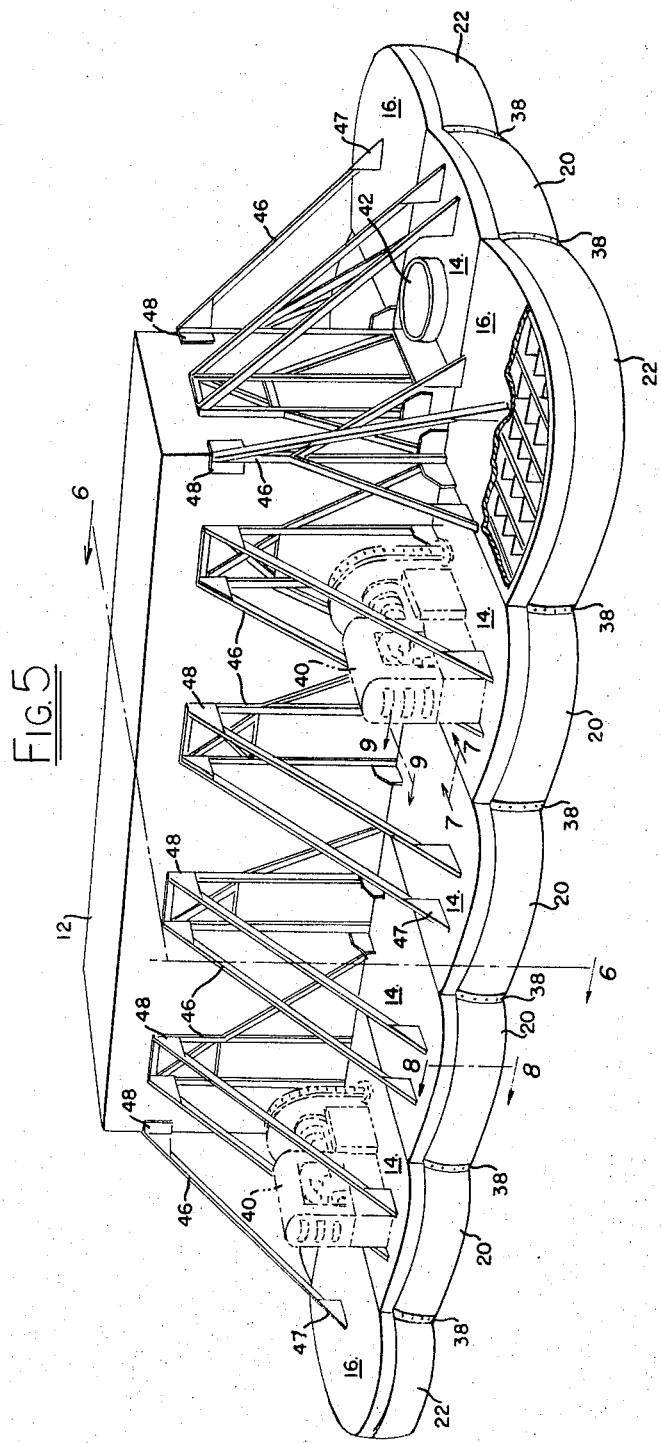
FIG. 5 is a top perspective view (with portions broken away to show the interior construction) of air cushion modules of another form of the invention as may be functionally combined with a load container in accordance with the invention.
Figure 6:
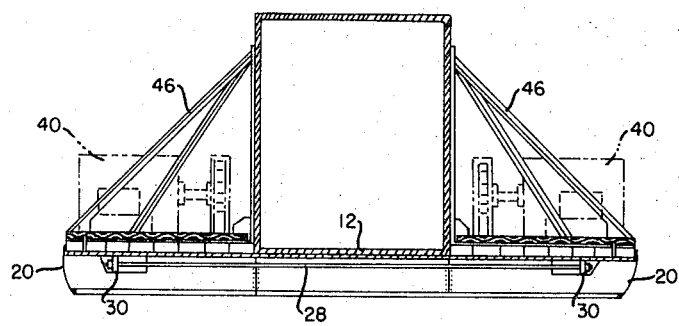
FIG. 6 is a sectional view taken as suggested by corresponding line of FIG. 5.

As shown by way of example at FIG. 1, a transport system of the invention may be assembled in connection with a load platform as shown at 12 by interconnecting in "ring-around" juxtaposed relation any required number of two basic type air cushion modules, comprising side modules 14; and corner modules 16. Note that as shown in the drawing herewith at FIGS. 1, 2, 10, the modules 14–16 are appended below their planform perimetrical edges by side-by-side downwardly extending air cushion sealing "fingers" or cellbag units designated 18. Also note that as shown at FIGS. 5, 6, of the drawing, the side modules 14' are provided alternatively with air cushion retaining skirt panels 20 depending from the outside perimetrical edges of the rigid platform members 14'; while the corner modules 16' are provided with skirt panels 22 depending from the outer perimeters thereof. The rigid platforms 16' are preferably circularly rounded in planform as best shown in FIG. 5 while the platforms 14' are also circularly rounded in planform along their outer edges. In any case, the skirt panels and/or cellbag units are provided so that whenever the modules 14-16, 14'-16' are combined and connected to each other and to the load platform 12 as shown in the drawing herewith, the skirt panels and/or cell-bag units will demarcate a single air cushion cavity underneath the load platform 12 and interiorly of the modules.

Figure 3:
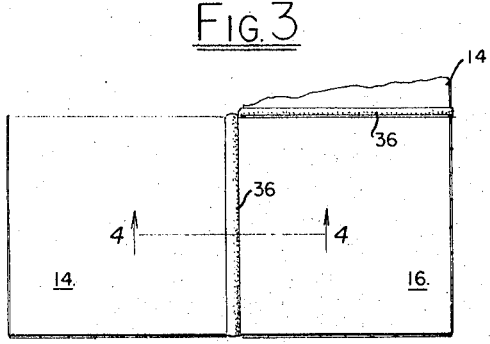
FIG. 3 is a fragmentary sectional view taken as suggested by line 3—3 of FIG. 1, showing how adjacently disposed modules are interconnected in air-sealing relation.
Figure 4:
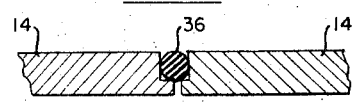
FIG. 4 is an enlarged scale fragmentary sectional view taken as suggested by line 4—4 of FIG. 3, showing a detail of a typical air-sealing arrangement.
Figure 7:
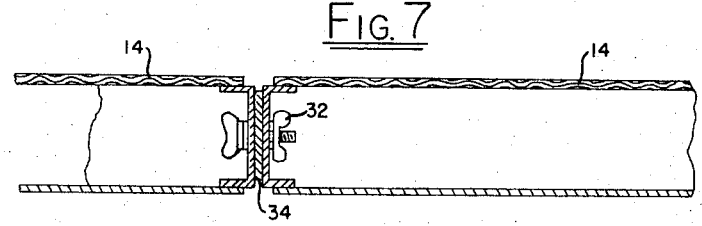
FIGS. 7, 8, 9, are fragmentary sectional views on enlarged scale, taken as suggested by corresponding lines of FIG. 5, and showing details of the module interconnection and load engaging arrangements.
Figure 8:
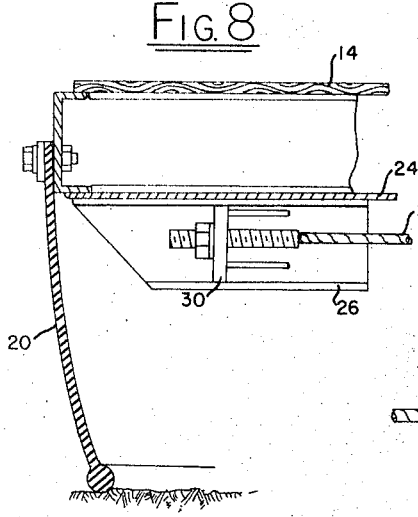
Figure 9:
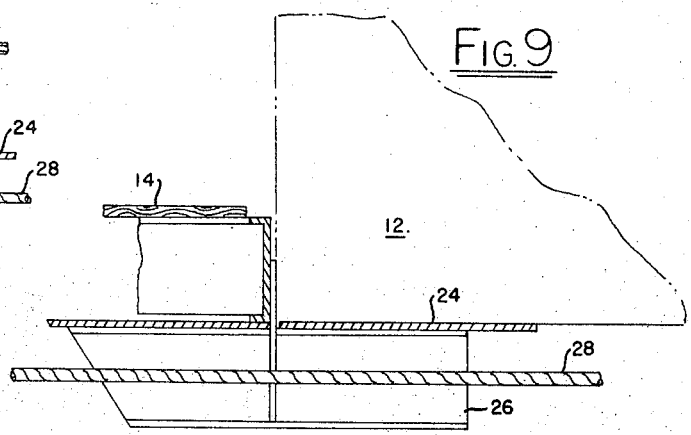

It is contemplated that any suitable means may be employed for connecting the modules to the load platform 12, such as shown for example at FIGS. 6–9, wherefrom it will be seen that the modules may be provided with flange plates 24 reinforced by I-beams or the like as indicated at 26; said flange plates 24 being thereby adapted to slip-fit underneath the perimetrical edges of the load platform 12. To retain modules at opposite sides of the load platform in properly aligned position a cable or tie rod or the like as illustrated at 28 may be employed to connect to brackets 30, 30 extending below opposite modules, whereby the tie rod or cable may be suitably tautened to lock the modules into engagement against the load platform. As best shown at FIG. 7, adjacent modules may be readily interconnected by means of any suitable detachable fasteners such as indicated at 32; an air sealing gasket or the like being preferably interposed between adjacent modules as indicated at 34. As best shown at FIGS. 3, 4, suitable air sealing gaskets may take the form of inflatable tubes or sponge rubber type gaskets as indicated at 36; and as illustrated at 38 (FIG. 5) any suitable detachable connection means may be employed to connect adjacent skirt panels together in air sealing relation.

Any suitable means may be employed for supplying air under pressure into the plenum or air cushion cavity comprising the undersurface of the load platform 12 and the interiors of the modules when interconnected as shown in the drawing herewith. For example, as illustrated at 40, one or more engine driven fans or blowers may be carried by one or more of the modules so as to be operable to blow air into the plenum at sufficient pressure to levitate the entire system so as to render it easily movable over any terrain as explained hereinabove. Alternatively, one or more of the modules may be equipped with an air inlet connection as shown at 42 (FIGS. 1, 5) whereby air may be furnished from an external source such as illustrated at 44 (FIG. 1).

Another particular feature of the present invention resides in the provision of truss-frames 46 which are rigidly connected at their lower ends to the rigid platforms of the modules as illustrated at 47 (FIG. 5) and which preferably carry container engaging pads 48 at their upper ends. These truss-frames not only stabilize the load container 12 but also prevent the modules from folding upwardly as though hingedly connected to and along the bottom edges of the load platform 12.

FIG. 10 illustrates another form of truss-frame arrangement such as may be employed in combination with a load platform and air cushion modules of the present invention. In this case the modules are arranged alongside the load platform 12 and connected thereto and to each other as explained hereinabove. A truss-frame such as illustrated at 50 may then be mounted at its opposite lower ends as indicated at 52, 52, so as to extend up over and to straddle the load 54 which is to be levitated. By connecting the upper portion of the truss-frame to the upper portion of the load as indicated at 56 the entire combination of load platform; modules 14–16; tie rods 28; truss-frame 50; and load 54, comprises an overall rigid truss-like structure; it being understood that as many truss-frames 50 as may be necessary will be employed according to the size and nature of the load.

I claim:

1. A ground effect load lift assembly comprising, in combination, a substantially air-tight horizontally disposed load platform carrying in rigid relation thereon a vertically extending load container, and a plurality of air cushion modules attached in air-sealing relation to side portions of said load platform to define in combination with said load platform a single plenum space, each of said modules having a rigid platform structure and a flexible cushion-air retaining means depending from only the outside edge portion thereof, means coupling said platform structures together in side-by-side air-sealing relation, means coupling said flexible cushion-air retaining means to define said plenum space with said load platform and platform structures, truss means extending rigidly and vertically from said module platform structures and laterally bearing against said load container to prevent said modules from swinging vertically relative to said load container and said load platform, and means for supply of air under pressure into said plenum space interiorly of said modules and under said load platform to provide air-cushion lift effect under the entire assembly.

2. A ground effect load lift assembly as set forth in claim 1, wherein said air cushion modules are disposed completely around said load platform.

3. A ground effect load lift assembly as set forth in claim 1, wherein the cushion air retaining skirts depending from adjacently disposed air cushion modules are detachably connected together along their juxtaposed vertical edge portions.

4. A ground effect load lift assembly as set forth in claim 1, wherein one or more of said air cushion modules carries a cushion air supply device.

5. A ground effect load lift assembly as set forth in claim 1, wherein compressible gasket devices are provided between juxtaposed side edge portions of said rigid platform structures.

6. A ground effect load lift assembly as set forth in claim 1, wherein at least one of said air cushion modules is provided with a cushion air supply connection device for coupling with an external air supply source.

7. A ground effect load lift assembly as set forth in claim 1, wherein cross-tie devices are provided to interconnect paired air cushion modules disposed at opposite sides of said load platform to maintain said modules in load platform engagement and in air cushion sealing relation.

8. A ground effect load lift assembly as set forth in claim 7, wherein said air cushion modules are provided with cantilever extending flange devices adapted to slip-fit horizontally into lifting engagements with said load platform.

* * * * *